US012745032B2

(12) United States Patent
Hu et al.

(10) Patent No.: US 12,745,032 B2
(45) Date of Patent: Sep. 22, 2026

(54) WIRELESS BLUETOOTH EARPHONE COMPRISING REPLACEABLE BATTERY

(71) Applicant: Charter Media (Dongguan) Co., Ltd., Dongguan (CN)

(72) Inventors: Juheng Hu, Dongguan (CN); Ken K Liauw, Dongguan (CN); David HS Chan, Dongguan (CN); Klaus CT Lee, Dongguan (CN)

(73) Assignee: CHARTER MEDIA (DONGGUAN) CO., LTD., Dongguan (CN)

( * ) Notice: Subject to any disclaimer, the term of this patent is extended or adjusted under 35 U.S.C. 154(b) by 161 days.

(21) Appl. No.: 18/788,069

(22) Filed: Jul. 29, 2024

(65) Prior Publication Data

US 2025/0071467 A1 Feb. 27, 2025

(30) Foreign Application Priority Data

Aug. 21, 2023 (CN) ......................... 202322248966.4

(51) Int. Cl.
*H04R 1/10* (2026.01)

(52) U.S. Cl.
CPC ......... *H04R 1/1058* (2013.01); *H04R 1/1016* (2013.01); *H04R 1/1041* (2013.01); *H04R 2420/07* (2013.01)

(58) Field of Classification Search
CPC .. H04R 1/1058; H04R 1/1016; H04R 1/1041; H04R 2420/07; H04R 1/1025; H04R 25/602; H04R 2225/025; H04R 25/60; H04R 25/65; H04R 2225/31
See application file for complete search history.

(56) References Cited

U.S. PATENT DOCUMENTS 5,654,111 A * 8/1997 Minomiya .......... H01M 10/425
429/162
2014/0270295 A1 * 9/2014 Kristensen ............. H04R 25/65
381/323

* cited by examiner

*Primary Examiner* — Carolyn R Edwards
*Assistant Examiner* — Mark Fischer
(74) *Attorney, Agent, or Firm* — MATTHIAS SCHOLL P.C.; Matthias Scholl

(57) ABSTRACT

A wireless Bluetooth earphone, including an earphone body including: a battery holder, a battery, a printed circuit board assembly (PCBA), a battery spring, a sealing plate, and a pop-up mechanism. The battery is disposed in the battery holder. The earphone body includes a recess, and the battery holder is embedded in the recess. The PCBA and the sealing plate are disposed in the earphone body. The PCBA is disposed over the sealing plate, and the sealing plate is disposed over the battery holder. The battery spring is disposed through the sealing plate to enable the PCBA to be electrically connected to the battery. The pop-up mechanism is rotatably disposed in the earphone body. The pop-up mechanism includes a first end leaning against the battery holder and a second end; when the second end is pushed, the first end moves to drive the battery holder out of the earphone body.

3 Claims, 2 Drawing Sheets

WIRELESS BLUETOOTH EARPHONE COMPRISING REPLACEABLE BATTERY

CROSS-REFERENCE TO RELATED APPLICATIONS

Pursuant to 35 U.S.C. § 119 and the Paris Convention Treaty, this application claims foreign priority to Chinese Patent Application No. 202322248966.4 filed Aug. 21, 2023, The contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a wireless Bluetooth earphone comprising a replaceable battery.

True wireless stereo (TWS) Bluetooth earphones have a relatively small size, which makes them comfortable to wear. However, TWS earphones have high requirements for waterproof and sealing properties. To satisfy the requirements, conventional TWS earphones are manufactured as glued and sealed non-detachable structure. In case the built-in battery of the TWS earphones fails, the entire device is scrapped. Till now, there have been no TWS Bluetooth earphones on the market with a replaceable battery.

SUMMARY

To solve the aforesaid problem, one objective of the disclosure is to provide a wireless Bluetooth earphone, comprising: an earphone body; the earphone body comprises a battery holder, a battery, a printed circuit board assembly (PCBA), a battery spring, a sealing plate, and a pop-up mechanism. The battery is disposed in the battery holder; the earphone body comprises a recess and the battery holder is embedded in the recess; the PCBA and the sealing plate are disposed in the earphone body; the PCBA is disposed over the sealing plate, and the sealing plate is disposed over the battery holder; the battery spring is disposed through the sealing plate to enable the PCBA to be electrically connected to the battery; the pop-up mechanism is rotatably disposed in the earphone body; the pop-up mechanism comprises a first end leaning against the battery holder and a second end; when in use, the second end is pushed, the first end moves to drive the battery holder out of the earphone body.

In a class of this embodiment, the earphone body comprises an upper body and a lower body attached to the upper body.

In a class of this embodiment, the pop-up mechanism comprises a lever block and a rotating shaft; the upper body comprises a side opening; the lever block comprises a central hole and the rotating shaft is disposed in the central hole; the rotating shaft comprises a first end connected to the sealing plate and a second end connected to the lower body; the lever block comprises a first end abutting against the battery holder and a second end disposed in and sealing the side opening.

The following advantages are associated with the wireless Bluetooth earphone comprising a replaceable battery of the disclosure. The wireless Bluetooth earphone is compact, waterproof, easy to wear. The battery of the wireless Bluetooth earphone is easy to replace.

DETAILED DESCRIPTION

To further illustrate the disclosure, embodiments detailing a wireless Bluetooth earphone comprising a replaceable battery are described below. It should be noted that the following embodiments are intended to describe and not to limit the disclosure.

It should be noted that when a part/component is mentioned to "be disposed on" another part/component, it may be disposed directly on the other part/component or there may be an intermediate part/component. When a component/part is mentioned to be "connected" to another component/part, it may be directly connected to the other component/part or there may be intermediate components/parts. As used herein, the term "connection" may include electrical and/or mechanical connections. As used herein, the term "includes/comprises" refers to the presence of a feature, step, or part/component, but does not preclude the presence or addition of one or more other features, steps, or parts/components. The term "and/or" as used herein includes any and all combinations of one or more of the relevant listed items.

Unless otherwise defined, all technical and scientific terms used herein have the same meaning as commonly understood by those skilled in the art of this application. Terms used herein are for the purpose of describing specific embodiments only and are not intended to limit the disclosure.

Figure 1:
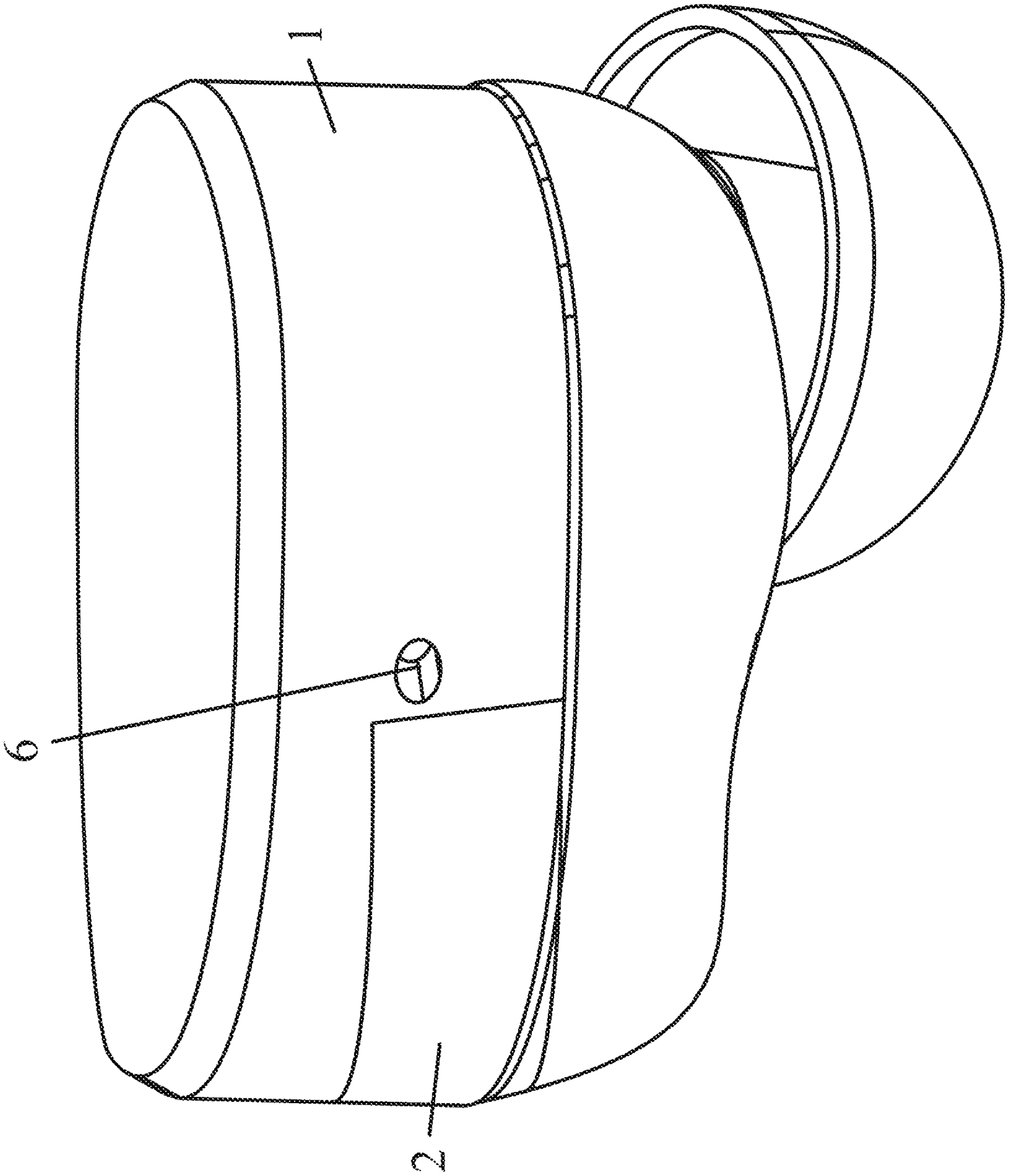
FIG. 1 is a schematic diagram of a wireless Bluetooth earphone comprising a replaceable battery in one embodiment of the disclosure.
Figure 2:
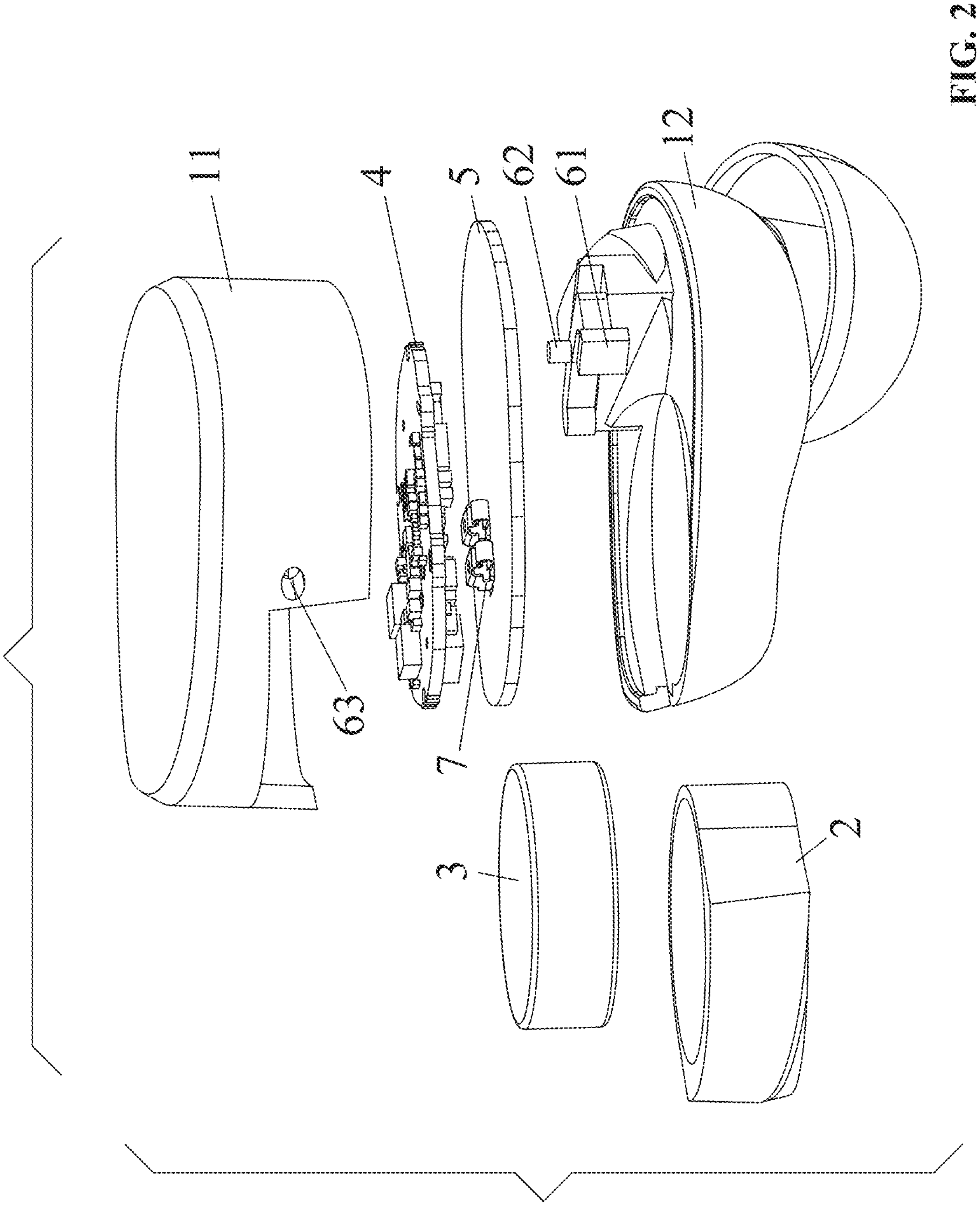
FIG. 2 is an exploded view of a wireless Bluetooth earphone comprising a replaceable battery in one embodiment of the disclosure.

As shown in FIGS. 1-2, the discourse provides a wireless Bluetooth earphone, comprising an earphone body 1; the earphone body 1 comprises a battery holder 2, a battery 3, a PCBA 4, a battery spring 7, a sealing plate 5, and a pop-up mechanism 6. The battery 3 is disposed in the battery holder 2. The earphone body 1 comprises a recess and the battery holder 2 is embedded in the recess. The battery holder 2 is in a sealed connection to the earphone body 1. The PCBA 4 and the sealing plate 5 are disposed in the earphone body 1. The PCBA 4 is disposed over the sealing plate 5, and the sealing plate 5 is disposed over the battery holder 2. The battery spring 7 is disposed through the sealing plate 5 to enable the PCBA 4 to be electrically connected to the battery 3. The pop-up mechanism 6 is rotatably disposed in the earphone body 1. The pop-up mechanism 6 comprises a first end leaning against the battery holder 2 and a second end. When the second end is pushed, the first end moves to drive the battery holder 2 out of the earphone body 1.

The earphone body 1 comprises an upper body 11 and a lower body 12 attached to the upper body 11. The pop-up mechanism 6 comprises a lever block 61 and a rotating shaft 62. The upper body 11 comprises a side opening 63. The lever block 61 comprises a central hole and the rotating shaft 62 is disposed in the central hole. The rotating shaft 62 comprises a first end connected to the sealing plate 5 and a second end connected to the lower body 12. The lever block 61 comprises a first end abutting against the battery holder 2 and a second end disposed in and sealing the side opening 63. The upper body 11, the lower body 12, and the battery holder 2 are watertight, and the material of the battery holder 2 is not limited to soft and hard rubber materials.

When installing the battery, the battery 3 is first placed onto the battery holder 2, and then the battery holder 2 is pushed into the earphone body 1 through the recess on the earphone body 1; when it is necessary to replace the battery 3, a tool is inserted into the side opening 63 to push the second end of the lever block 61, so that the first end of the lever block 61 drives the battery holder 2 out of the earphone body 1, and the battery 3 can be replaced.

The wireless Bluetooth earphone is compact, waterproof, easy to wear. The battery of the wireless Bluetooth earphone is easy to replace.

It will be obvious to those skilled in the art that changes and modifications may be made, and therefore, the aim in the appended claims is to cover all such changes and modifications.

What is claimed is:

1. A wireless Bluetooth earphone, comprising: an earphone body; the earphone body comprising a battery holder, a battery, a printed circuit board assembly (PCBA), a battery spring, a sealing plate, and a pop-up mechanism;

wherein, the battery is disposed in the battery holder;

the earphone body comprises a recess and the battery holder is embedded in the recess;

the PCBA and the sealing plate are disposed in the earphone body; the PCBA is disposed over the sealing plate, and the sealing plate is disposed over the battery holder;

the battery spring is disposed through the sealing plate to enable the PCBA to be electrically connected to the battery;

the pop-up mechanism is rotatably disposed in the earphone body; and the pop-up mechanism comprises a first end leaning against the battery holder and a second end; when in use, the second end is pushed, the first end moves to drive the battery holder out of the earphone body.

2. The wireless Bluetooth earphone of claim 1, wherein the earphone body comprises an upper body and a lower body attached to the upper body.

3. The wireless Bluetooth earphone of claim 2, wherein the pop-up mechanism comprises a lever block and a rotating shaft; the upper body comprises a side opening; the lever block comprises a central hole and the rotating shaft is disposed in the central hole; the rotating shaft comprises a first end connected to the sealing plate and a second end connected to the lower body; the lever block comprises a first end abutting against the battery holder and a second end disposed in and sealing the side opening.

* * * * *